United States Patent [19]
Fichenauer et al.

[11] Patent Number: 4,906,688
[45] Date of Patent: Mar. 6, 1990

[54] THERMOPLASTIC MOULDING COMPOSITIONS OF THE ABS TYPE OF IMPROVED TOUGHNESS AND PROCESSABILITY

[75] Inventors: Herbert Fichenauer; Edgar Leitz, both of Dormagen; Karl-Heinz Ott, Leverkusen; Alfred Pischtschan, Kuerten-Eichhof, all of Fed. Rep. of Germany

[73] Assignee: Bayer Aktiengesellschaft, Leverkusen-Bayerwerk, Fed. Rep. of Germany

[21] Appl. No.: 319,273

[22] Filed: Mar. 6, 1989

[30] Foreign Application Priority Data

Mar. 17, 1988 [DE] Fed. Rep. of Germany ...... 3808846

[51] Int. Cl.$^4$ .............................................. C08L 69/00
[52] U.S. Cl. ....................................... 525/67; 525/146; 525/148
[58] Field of Search ................. 525/67, 468, 146, 148, 525/902

[56] References Cited

U.S. PATENT DOCUMENTS 3,637,909  1/1972  Bonin et al. ..................... 525/468 X
4,560,725 12/1985  Van Bokhoven ..................... 525/67

FOREIGN PATENT DOCUMENTS 0191942  8/1986  European Pat. Off. .

Primary Examiner—Theordore E. Pertilla
Attorney, Agent, or Firm—Connolly and Hutz

[57] ABSTRACT

Thermoplastic moulding compounds containing
(A) from 5–90 parts by weight of one or more thermoplastic polymers,
(B) from 5–90 parts by weight of one or more graft polymers and
(C) from 0.25–40 parts by weight of a linear aliphatic polycarbonate.

3 Claims, No Drawings

THERMOPLASTIC MOULDING COMPOSITIONS OF THE ABS TYPE OF IMPROVED TOUGHNESS AND PROCESSABILITY

ABS polymers are distinguished by their well-balanced properties of toughness, dimensional stability under heat, processability and surface quality. When ABS polymers are to be manufactured which have special properties (such as exceptional toughness or high dimensional stability under heat), these desired properties can generally only be obtained at the expense of other properties.

one special problem is the preparation of ABS products of very high notched impact strength.

Both methods employed in practice, namely
(a) increasing the graft rubber content and
(b) increasing the molecular weight of the styrene/acrylonitrile copolymer (resin matrix), as well as combinations thereof, result in a sharp increase in the melt viscosity, i.e. a marked deterioration of the thermoplastic processability and the appearance of surface defects.

It has now been found that ABS polymers combining great toughness with excellent processability can be obtained by the addition of a specific aliphatic polycarbonate.

The present invention relates to thermoplastic moulding compounds containing
(A) from 5-90 parts by weight, preferably from 10-80 parts by weight, most preferably from 20-75 parts by weight, of one or more thermoplastic polymers of styrene, α-methylstyrene, styrene substituted in the nucleus, methylmethacrylate, acrylonitrile, methacrylonitrile, maleic acid anhydride, N-substituted maleimide, vinyl acetate and mixtures thereof
(B) from 5-90 parts by weight, preferably from 10-80 parts by weight, most preferably from 15-60 parts by weight, of one or more graft polymers of
  (B.1) from 5-90 parts by weight, preferably from 30-80 parts by weight, of styrene, α-methylstyrene, styrene substituted in the nucleus, methylmethacrylate, acrylonitrile, methacrylonitrile, maleic acid anhydride, N-substituted maleimide, vinyl acetate or mixtures thereof on
  (B.2) from 95-10 parts by weight, preferably from 70-20 parts by weight, of a rubber having a glass temperature of $\leq 10°$ C. and
(C) from 0.25-40 parts by weight, preferably from 0.5-30 parts by weight, of a linear aliphatic polycarbonate.

The mixture according to the invention of copolymer (A), graft polymer (B) and liner aliphatic polycarbonate (C) can contain conventional additives such as flame retardants, stabilizers, mould release agents, pigments, lubricants, antistatic agents and fillers in the usual quantities.

The addition of polycarbonate (C) results in moulding compounds of the ABS type which combine great toughness with improved fluidity and hence improved processability. This means that even very tough injection moulded parts of large dimensions or a complicated structure, e.g. computer casings or automobile parts can be produced more easily and at lower temperatures owing to the improved fluidity.

Thermoplastic polymers (A) suitable according to the invention include those obtained from styrene, α-methylstyrene, p-methylstyrene, vinyl toluene, halogenated styrene, methylacrylate, methylmethacrylate, acrylonitrile, methacrylonitrile, maleic acid anhydride and N-substituted maleimide or mixtures thereof.

The polymers (A) are resinous, thermoplastic and free from rubber. Particularly preferred polymers (A) include those obtained from styrene, methylmethacrylate, styrene/acrylonitrile mixtures, styrene/acrylonitrile/methylmethacrylate mixtures, styrene/methylmethacrylate mixtures, acrylonitrile/methylmethacrylate mixtures, α-methylstyrene/acrylonitrile mixtures, styrene-α-methylstyrene/acrylonitrile mixtures, α-methylstyrene/methacrylstyrene/methylmethacrylate/acrylonitrile mixtures, styrene/α-methylstyrene/methylmethacrylate mixtures, styrene/α-methylstyrene/methylmethacrylate/acrylonitrile mixtures, styrene/maleic acid anhydride mixtures, methylmethacrylate/maleic acid anhydride mixtures and styrene/methylmethacrylate/maleic acid anhydride mixtures.

The polymers (A) are known and may be prepared by radical polymerization, in particular by emulsion, suspension, solution or solvent-free polymerization. They preferably have molecular weights $\overline{M}_w$ of from 20,000 to 200,000 and limiting viscosities ($\eta$) of from 20 to 110 ml/g (determined in dimethylformamide at 25° C.).

Rubbers suitable for the preparation of the graft polymers (B) include in particular polybutadiene, butadiene/styrene copolymers, butadiene/acrylonitrile copolymers, polyisoprene, EPM rubbers (ethylene/propylene rubbers), EPDM rubbers (ethylene/propylene/diene rubbers containing, as diene, small quantities of a non-conjugated diene such as hexadiene-(1,5) or norbornadiene) or alkylacrylate rubbers based on $C_1$–$C_8$-alkylacrylates, in particular ethyl, butyl or ethylhexylacrylate.

The alkylacrylate rubbers may contain up to 30% by weight (based on the weight of rubber) of monomers such as vinyl acetate, acrylonitrile, styrene, methylmethacrylate and/or vinyl ether in copolymerised form. In addition, the alkylacrylate rubbers may contain minor quantities, preferably up to 5% by weight (based on the weight of rubber) of ethylenically unsaturated monomers which have a cross-linking action. Examples of such cross-linking agents include alkylenediol-diacrylates and -methacrylates, polyester-diacrylates and -methacrylates, divinylbenzene, trivinylbenzene, triallylcyanurate, allyl(meth)acrylate, butadiene and isoprene. Acrylate rubbers used as graft basis may also be core/shell copolymers containing, as core, a crosslinked diene rubber of one or more conjugated dienes such as polybutadiene or a copolymer of a conjugated diene with an ethylenically unsaturated monomer such as styrene and/or acrylonitrile.

Diene rubbers and alkylacrylate rubbers are preferred rubbers for the preparation of graft polymers (B).

The rubbers are contained in the graft polymer (B) in the form of at least partially cross-linked particles having an average particle diameter of from 0.05 to 20.0 μm, preferably from 0.1 to 2.0 μm, most preferably from 0.1 to 0.8 μm. The average particle diameter is defined in this context as the average particle diameter $d_{50}$ determined by ultracentrifuge measurements according to W. Scholtan et al, Kolloid-Z, u.z. Polymere 250 (1972), 782–796.

The graft polymers (B) are prepared by radical graft polymerization of the monomers or monomer mixtures (B.1) defined above in the presence of the rubbers (B.2) which are to be grafted.

Preferred methods of preparation of the graft polymers (B) are emulsion, solution, solvent-free and suspension polymerization and combinations of these processes carried out in known manner. So-called ABS polymers are particularly preferred graft polymers (B).

The linear aliphatic polycarbonates (C) are compounds corresponding to the general formula (I)

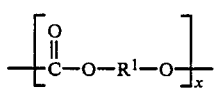

wherein
R$^1$=—(CH$_2$)$_n$ wherein n=3–12, —CH$_2$CH$_2$CH(CH$_3$)—, —CH$_2$CH$_2$OCH$_2$CH$_2$—, —CH$_2$CH$_2$OCH$_2$CH$_2$OCH$_2$CH$_2$—,
—C$_2$CH(CH$_3$)CH$_2$CH$_2$C(CH$_3$)$_2$CH$_2$—,

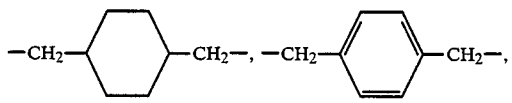

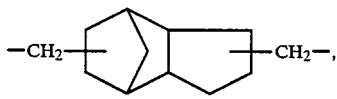

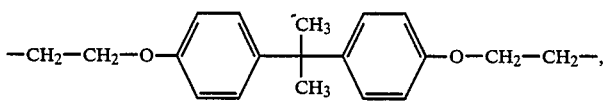

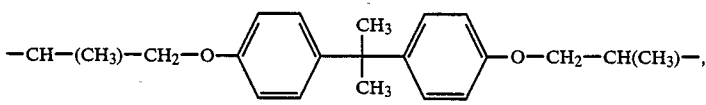

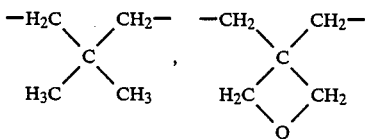

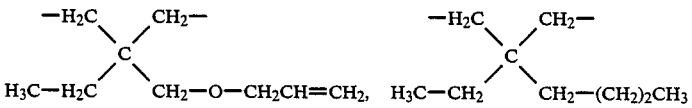

and
x stands for an integer corresponding to a molecular weight of from 2000 to 500,000.

Polyneopentyl glycol carbonate having the recurring structural unit (II)

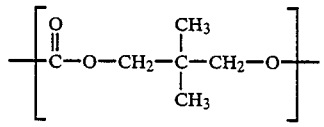

is a preferred aliphatic polycarbonate (C).

The aliphatic polycarbonates (C) may be prepared by conventional methods, e.g. by transesterification or phosgenation of diols (DE-OS 2 001 091, FR-PS 1 391 512, DE-OS 1 031 512, DE-OS 2 446 107, DE-OS 2 605 024, EP 002 641 and DE-OS 2 447 349) but are preferably prepared by ring opening solvent-free or solution polymerisation of cyclic aliphatic carbonates (DE-OS 1 545 116, 1 545 117, 3 103 135, 3 204 078).

The preferred method of preparation is the anionic ring opening solution polymerisation of cyclic aliphatic carbonates at low temperatures according to DE-OS 3 607 625.

Cyclic aliphatic carbonates for the preparation of the aliphatic polycarbonate (C) are compounds corresponding to formula (III)

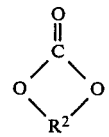

wherein
R$^2$=—(CH$_2$)$_n$ wherein n=3–12, —CH$_2$CH$_2$CH(CH$_3$)—, —CH$_2$CH$_2$OCH$_2$CH$_2$—, —CH$_2$CH$_2$OCH$_2$CH$_2$OCH$_2$CH$_2$—,
—CH$_2$CH(CH$_3$)CH$_2$CH$_2$C(CH$_3$)$_2$CH$_2$—,

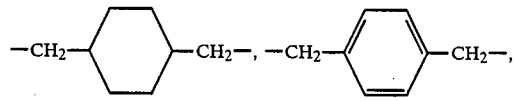

-continued

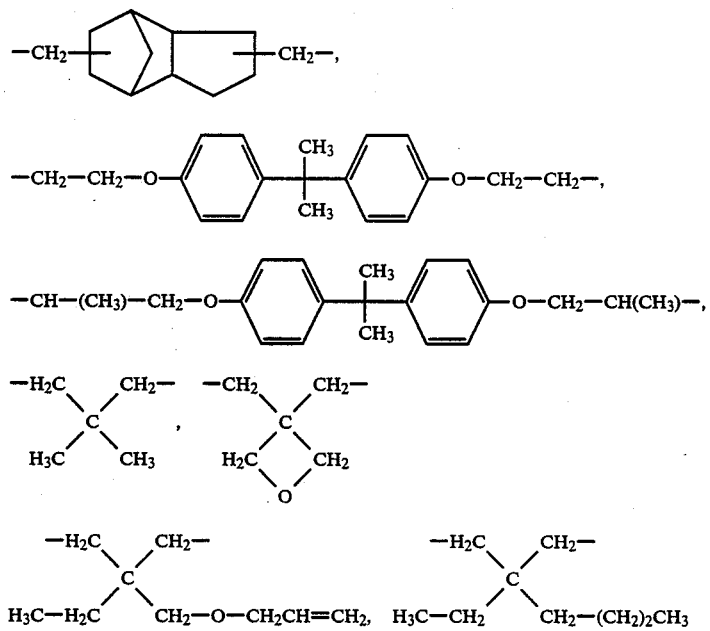

and compounds corresponding to formula (IV)

$$O=C\diagup^{O-R^3-O}\diagdown_{O-R^3-O}C=O \qquad (IV)$$

$R^3=$ —$(CH_2)_n$— wherein n=4–12, —$CH_2C$-$H_2OCH_2CH_2$—, —$CH_2CH_2OCH_2CH_2OCH_2C$-$H_2$—.

Carbonates of formula (III) are preferably used. The carbonate in which $R^2 =$ 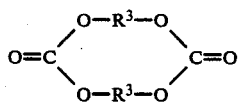

is particularly preferred.

Preferred aliphatic polycarbonates (C) are the products with molecular weight $\overline{M}_w$ in the range of from 2000 to 500,000, preferably from 15,000 to 350,000, obtained according to DE-OS 3 607 625.

The mixtures according to the invention containing components (A), (B) and (C) and optionally conventional additives such as flame-retardants, lubricants, stabilizers, pigments, mould release agents, antistatic agents or fillers are prepared by mixing the components together in known manner, either simultaneously or successively, at room temperature or at elevated temperature, and then melt compounding or melt extruding the mixture at temperatures of from 150° C. to 300° C. in conventional apparatus such as internal kneaders, extruders or double shaft screws.

The moulding compounds according to the present invention may be used for the production of moulded articles of all types. Conventional production methods may be employed for these articles, in particular injection moulding.

Another method of working up the moulding compounds according to the invention is the production of moulded articles by deep drawing plates or sheets previously produced by known processes.

EXAMPLES

Thermoplastic polymer (A)

A 1: Statistical styrene/acrylonitrile copolymer having a $\overline{M}_w$ of about 115,000 and a heterogeneity index $\overline{M}_w/\overline{M}_n$-1≦2.0. (weight ratio styrene:acrylonitrile=72:28)

A 2: Statistical α-methylstyrene/acrylonitrile-copolymer having a $\overline{M}_w$ of about 75,000 and a heterogeneity index $\overline{M}_w/\overline{M}_n$-1≦2.0. (weight ratio α-methylstyrene:acrylonitrile=70:30)

Graft polymer (B)

Graft product obtained by emulsion polymerization of 50% by weight of a styrene/acrylonitrile mixture (ratio by weight 72:28) on 50% by weight of particulate polybutadiene having an average particle diameter ($d_{50}$) of 0.4 μm.

Polycarbonate (C)

Aliphatic polycarbonate based on neopentylglycol (2,2-dimethylpropanediol-(1,3)), obtained by ring opening anionic polymerization of a neopentylglycol carbonate, having a relative solution viscosity $\eta_{rel}$ of 3.17 (2% by weight solution in $CH_2Cl_2$ at 20° C.).

(A), (B) and (C) were compounded with 0.1 part by weight of a silicone oil in a 1.3 l internal kneader at temperatures of 160° C. to 200° C. The moulded articles were produced in an injection moulding machine at 240° C.

The notched impact strength ($a_k$) was determined according to DIN 53 453 (unit: kJ/m²) at room temperature. The processability was determined by measuring the melt-flow index MVI according to DIN 53 735 U (unit: cm³/10 min) and the filling pressure required (see F. Johannaber, Kunststoffe 74 (1984), 1, pages 2–5).

The compositions of the moulding compounds investigated and the test data obtained are summarized in Table 1. Compared with the comparison experiments, the compositions according to the invention have lower values for filling pressure and higher MVI values and a marked increase in toughness.

TABLE 1

| | Compositions and test data of the moulding compounds | | | | | | |
|---|---|---|---|---|---|---|---|
| Example | A1 Parts by wt. | A2 Parts by wt. | B Parts by wt. | C Parts by wt. | $a_k$ kJ/m² | MVI | Filling pressure (240° C.) bar |
| 1. (according to the invention) | 60 | — | 40 | 2 | 19.3 | 8.1 | 369 |
| 2. (according to the invention) | 55 | — | 40 | 5 | 21.5 | 8.7 | 355 |
| 3. (according to the invention) | 50 | — | 40 | 10 | 25.0 | 12.3 | 337 |
| 4. (according to the invention) | 45 | — | 40 | 15 | 22.0 | 15.9 | 319 |
| 5. (comparison) | 60 | — | 40 | — | 17.1 | 7.2 | 375 |
| 6. (according to the invention) | — | 70 | 30 | 2 | 13.2 | 2.1 | 451 |
| 7. (comparison) | — | 70 | 30 | — | 13.0 | 1.9 | 469 |

We claim:

1. Thermoplastic moulding compounds containing
   (A) from 5–90 parts by weight of one or more thermoplastic polymers of styrene, α-methylstyrene, styrene substituted in the nucleus, methylmethacrylate, acrylonitrile, methacrylonitrile, maleic acid anhydride, N-substituted maleimide and vinyl acetate, or mixtures thereof
   (B) from 5–90 parts by weight of one or more graft polymers of
   (B.1) from 5–90 parts by weight of styrene, α-methylstyrene, styrene substituted in the nucleus, methylmethacrylate, acrylonitrile, methacrylonitrile, maleic acid anhydride, N-substituted maleimide, vinyl acetate or mixtures hereof on
   (B.2) from 95–10 parts by weight of a rubber having a glass temperature of ≦10° C. and
   (C) from 0.25–40 parts by weight of a linear aliphatic polycarbonate.

2. Thermoplastic moulding compounds according to claim 1, containing a linear aliphatic polycarbonate (C) prepared by anionic ring opening polymerization.

3. Thermoplastic moulding compounds according to claim 1, containing polyneopentyl glycol carbonate as component (C).

* * * * *

UNITED STATES PATENT AND TRADEMARK OFFICE
CERTIFICATE OF CORRECTION

PATENT NO. : 4,906,688
DATED : MARCH 6, 1990
INVENTOR(S) : EICHENAUER ET AL

It is certified that error appears in the above-identified patent and that said Letters Patent is hereby corrected as shown below:

On the face of the patent in the list of inventors, the first inventor should read --Herbert Eichenauer--.

Item [19]: "Fichenauer et al." should read --Eichenauer et al.--.

Signed and Sealed this

Ninth Day of July, 1991

Attest:

HARRY F. MANBECK, JR.

*Attesting Officer*  *Commissioner of Patents and Trademarks*